US009921306B1

(12) United States Patent
Friesel

(10) Patent No.: US 9,921,306 B1
(45) Date of Patent: Mar. 20, 2018

(54) ACTIVE OPTIMAL REDUCED STATE ESTIMATOR

(71) Applicant: Lockheed Martin Corporation, Bethesda, MD (US)

(72) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 352 days.

(21) Appl. No.: 14/723,114

(22) Filed: May 27, 2015

(51) Int. Cl.
*G06F 19/00* (2011.01)
*G01S 13/72* (2006.01)

(52) U.S. Cl.
CPC .................... *G01S 13/72* (2013.01)

(58) Field of Classification Search
CPC ..... G01S 13/723; G01S 5/0252; G06F 3/0346
USPC ............................ 702/64–66, 182–185, 191
See application file for complete search history.

(56) References Cited

U.S. PATENT DOCUMENTS

| 3,952,304 | A | * | 4/1976 | Broniwitz | G01S 13/4472 342/107 |
|---|---|---|---|---|---|
| 5,325,098 | A | | 6/1994 | Blair et al. | |
| 6,226,409 | B1 | | 5/2001 | Cham et al. | |
| 6,278,401 | B1 | | 8/2001 | Wigren | |
| 7,009,554 | B1 | | 3/2006 | Mookerjee et al. | |
| 7,180,443 | B1 | | 2/2007 | Mookerjee et al. | |
| 7,277,047 | B1 | | 10/2007 | Mookerjee et al. | |
| 7,705,780 | B1 | | 4/2010 | Khoury | |
| 7,719,461 | B1 | | 5/2010 | Mookerjee et al. | |
| 8,886,394 | B2 | | 11/2014 | Noonan | |
| 2005/0128138 | A1 | | 6/2005 | McCabe et al. | |
| 2008/0120031 | A1 | | 5/2008 | Rosenfeld et al. | |
| 2009/0021423 | A1 | * | 1/2009 | Cheng | G01S 7/003 342/25 A |
| 2009/0231183 | A1 | | 9/2009 | Nettleton et al. | |

OTHER PUBLICATIONS

Y. Bar-Shalom, M. Mallick, H. Chen, and R. Washburn, "One-Step Solution for the General Out-of-Sequence-Measurement Problem in Tracking," Proceedings of 2002 IEEE Aerospace Conference Proceedings, vol. 4, pp. 1551-1559, 2002.

(Continued)

*Primary Examiner* — Edward Raymond
(74) *Attorney, Agent, or Firm* — Howard IP Law Group, P.C.

(57) ABSTRACT

An active state estimation system comprises radar systems for obtaining sensor measurements, data storage devices for storing the sensor measurements, and computer processors in communication with the data storage devices. A memory stores program instructions which cause the computer processors to initialize a system having state variables and also having unknown, multidimensional, arbitrarily time-varying parameters, but which are subject to known bounded values. Sensor measurements for the object being tracked are then received, and applied to an estimating filter that explicitly uses a mean square optimization criterion that separately accounts for measurement errors and said bounding values, to produce estimates of the true state of the system. The system also determines whether a regime change has occurred based on the estimates of the true state of the system, and if so, determines updated known bounded values that are used to update the boundaries used by the system.

20 Claims, 6 Drawing Sheets

(56) References Cited

OTHER PUBLICATIONS

G.J. Portmann, J.R. Moore, and W.G. Bath, "Separated Covariance Filtering," Record of the IEEE 1990 International Radar Conference, 1990, pp. 456-460.

Y. Bar-Shalom, "Update with Out-of-Sequence Measurements in Tracking: Exact Solution," IEEE Transactions on Aerospace and Electronic Systems, pp. 769-778, vol. AES-38, No. 3, Jul. 2002.

E. Mazar, A. Averbuch, Y. Bar-Shalom, and J. Dayan, "Interacting Multiple Model Methods in Target Tracking: A Survey," IEEE Transactions on Aerospace and Electronic Systems, 34, 1 (Jan. 1998), 103-123.

W.D. Blair and Y. Bar-Shalom, "Tracking Maneuvering Targets with Multiple Sensors: Does More Data Always Mean Better Estimates?" IEEE Transactions on Aerospace and Electronic Systems, pp. 450-456, vol. AES-32, No. 1, Jan. 1996.

\* cited by examiner

ACTIVE OPTIMAL REDUCED STATE ESTIMATOR

FIELD OF THE INVENTION

The present invention relates generally to state estimation of systems, and more particularly, to state estimation systems with actively updated bounded parameters.

BACKGROUND

Consistent and accurate methods for performing state estimation in a wide-variety of systems are critical to the function of many processes and operations, both civilian and military. Systems and methods have been developed for state estimation of a system that may transition between different regimes of operation (e.g., flight regimes) which may be described or defined by a plurality of discrete models. These state estimation methods may be applied to various systems having sensory inputs, by way of non-limiting example only, nuclear, chemical, or manufacturing factories or facilities, control processes subject to external parameter changes, space stations subject to vibrations, automobiles subject to road conditions, and the like. One particularly useful application for state estimation is tracking objects in flight, such as a multistage rocket that is transitioning back and forth between a ballistic model of flight and thrust modes, or an aircraft performing maneuvers mid-flight. For example, an aircraft being tracked may engage in multiple different regimes such as such as cruise, loiter, supersonic dash, maneuvers such as pop-up maneuvers, and missile launch. Likewise, a multistage rocket may engage in different regimes such as ballistic flight and boosted or propelled flight.

Recent state estimate systems include Optimal Reduced State Estimation (ORSE) filters for tracking an object. ORSE filters are reduced state because parametric acceleration is not represented in the filter model but is instead estimated as an independently calculated part of the covariance matrix. The filter is optimal because it reduces errors in the least squares sense. ORSE filters include bounds or maximum excursions for various parameters, and minimizes the mean-square and, thus, the root-mean-square (RMS) estimation errors for the maximum excursions of the parameters in the truth model. Furthermore, because the bounds are included in the minimized covariance, embodiments of the present invention do not need white plant noise, as is required by Kalman filters, to cope with the reduced state. In an exemplary aircraft tracking embodiment, using the physical bounds (i.e. maximum excursions) on various parameters, such as turn rate boundary parameters and tangential acceleration boundary parameters, ORSE filtering may provide for increased estimation consistency. Maximum accelerations produced by these bounded parameters, along the instantaneous normal and tangential airplane axes, bound all physically possible maneuvers. U.S. Pat. No. 7,180,443, issued Feb. 20, 2007 in the names of Mookerjee and Reifler, which is incorporated by reference in its entirety, describes an ORSE state estimator for determining state estimation and state error covariances for generalized or arbitrary motion of a target or moving object where the sensors provide complete measurements, namely each measurement locating a point in three dimensional space at a known time with a non-singular measurement covariance matrix.

Current implementations of ORSE initialize various parameters with the maximum bias or excursions expected over the lifetime of the track. However, maximum bias input into an ORSE filter may be unnecessarily oversized and may become stale over time. Thus, the current initialization implementations cause oversized uncertainties, in particular when maximum bias/uncompensated acceleration is dependent upon current track state. An example are drag forces, which vary with speed and altitude. In current implementations, the ORSE component for drag is initialized as the highest drag expected over the duration of the track, which may overestimate the magnitude of drag over much of the trajectory. For example, current ORSE implementation may use a lambda matrix containing the maximum expected uncompensated acceleration. When representing drag and similar forces that depend upon flight regime, the initial selection may no longer be applicable and potentially assume maximum accelerations far higher than may be possible.

Improved systems and methods for ORSE state estimation are desired.

SUMMARY

A method for estimating the state of an object is provided. In an embodiment, a system for actively estimating the state of a system may comprise: one or more radar systems for obtaining sensor measurements relating to an object being tracked; one or more data storage devices for storing the sensor measurements; one or more computer processors in communication with the one or more data storage devices; and a memory storing program instructions. When the program instructions are executed by the one or more computer processors, the one or more computer processors may: initialize a system having state variables and also having unknown, multidimensional, arbitrarily time-varying parameters, but which are subject to known bounded values; receive measurements from one or more sensors corresponding to an object to be tracked; and apply the measurements to an estimating filter that explicitly uses a mean square optimization criterion that separately accounts for measurement errors and said bounding values, to produce estimates of the true state of the system. The system may then determine whether a regime change has occurred based on the estimates of the true state of the system, and responsive to a positive determination that a regime change has occurred: determine updated known bounded values; and update the known bounded values of the system with the updated known bounded values before applying subsequent measurements to the estimating filter.

The memory may store further program instructions which cause the one or more computer processors to output, to a tracker computer, the estimates of the true state of the system. In an embodiment, the memory storing program instructions which cause the one or more computer processors to initialize a system having state variables and also having unknown, multidimensional, arbitrarily time-varying parameters, but which are subject to known bounded values, may comprise the memory storing program instructions which cause the one or more computer processors to: initialize state estimates and system matrices for the system; determine initial bounded values applicable to the object; and determine boundary parameter covariances corresponding to the initial bounded values, wherein the initial bounded values are physical bounds on the boundary parameters that are not state variables of the system.

In an embodiment, the memory storing program instructions which cause the one or more computer processors to apply the measurements to an estimating filter that explicitly uses a mean square optimization criterion that separately accounts for measurement errors and said bounding values may comprise the memory storing program instructions which cause the one or more computer processors to: extrapolate a state estimate, covariance, and bias coefficients; input a measurement noise covariance; compute filter gains; input the received measurements from the one or more sensors; and update the state estimate, covariance, and bias coefficients based on the received measurements. The memory storing program instructions which cause the one or more computer processors to determine whether a regime change has occurred based on the estimates of the true state of the system may comprise the memory storing program instructions which cause the one or more computer processors to compare a previous flight regime of the object to a current flight regime of the object. The memory storing program instructions which cause the one or more computer processors to determine whether a regime change has occurred based on the estimates of the true state of the system may comprise the memory storing program instructions which cause the one or more computer processors to determine whether a change in the flight regime of the object is likely to occur.

The memory storing program instructions which cause the one or more computer processors to determine whether a change in the flight regime of the object is likely to occur may comprise the memory storing program instructions which cause the one or more computer processors to: identify a type of the object being tracked; identify a current flight regime of the object; and determine whether the flight regime of the object is likely to occur based on analysis of the type of the object, the current flight regime of the object, the received measurements from the one or more sensors, and data indicative of flight characteristics corresponding to the type of object. In an embodiment, the memory storing program instructions which cause the one or more computer processors to, responsive to a determination that a regime change has occurred, determine updated known bounded values and update the known bounded values of the system with the updated known bounded values may comprise the memory storing program instructions which cause the one or more computer processors to: determine, based on a type of the object being tracked and a regime of the object being tracked, updated known bounded values; and determine boundary parameter covariances corresponding to the updated bounded values, wherein the updated bounded values are physical bounds on the boundary parameters that are not state variables of the system.

A method for actively estimating the state of a system may comprise the steps of: initializing, by one or more computer processors, a system having state variables and also having unknown, multidimensional, arbitrarily time-varying parameters, but which are subject to known bounded values; receiving, by the one or more computer processors, measurements from one or more sensors corresponding to an object to be tracked; and applying, by the one or more computer processors, the measurements to an estimating filter that explicitly uses a mean square optimization criterion that separately accounts for measurement errors and said bounding values, to produce estimates of the true state of the system. The method may further comprise determining, by the one or more computer processors, whether a regime change has occurred based on the estimates of the true state of the system; and responsive to a positive determination that a regime change has occurred, updating, by one or more computer processors, the known bounded values of the system before applying subsequent measurements to the estimating filter.

In an embodiment, the method may further comprise outputting, by the one or more computer processors to a tracker computer, the estimates of the true state of the system. Initializing the system having state variables and also having unknown, multidimensional, arbitrarily time-varying parameters, but which are subject to known bounded values may comprise: initializing, by the one or more computer processors, state estimates and system matrices for the system; determining, by the one or more computer processors, initial bounded values applicable to the object; and determining, by the one or more computer processors, boundary parameter covariances corresponding to the initial bounded values, wherein the initial bounded values are physical bounds on the boundary parameters that are not state variables of the system. Applying the measurements to an estimating filter that explicitly uses a mean square optimization criterion that separately accounts for measurement errors and said bounding values may comprise: extrapolating, by the one or more computer processors, a state estimate, covariance, and bias coefficients; inputting, by the one or more computer processors, a measurement noise covariance; computing, by the one or more computer processors, filter gains; inputting, by the one or more computer processors, the received measurements from the one or more sensors; and updating, by the one or more computer processors, the state estimate, covariance, and bias coefficients based on the received measurements.

Determining whether a regime change has occurred based on the estimates of the true state of the system may comprise comparing a previous flight regime of the object to a current flight regime of the object. In embodiments, the method may further comprise: identifying, by the one or more computer processors, a type of the object being tracked; identifying, by the one or more computer processors, a current flight regime of the object; and determining, by the one or more computer processors, whether the flight regime of the object is likely to occur based on analysis of the type of the object, the current flight regime of the object, the received measurements from the one or more sensors, and data indicative of flight characteristics corresponding to the type of object. Determining whether a regime change has occurred based on the estimates of the true state of the system comprises determine whether a change in the flight regime of the object is likely to occur. Determining updated known bounded values and updating the known bounded values of the system with the updated known bounded values may comprise: determining, by the one or more computer processors based on a type of the object being tracked and a regime of the object being tracked, updated known bounded values; and determining, by the one or more computer processors, boundary parameter covariances corresponding to the updated bounded values, wherein the updated bounded values are physical bounds on the boundary parameters that are not state variables of the system.

In an embodiment, a system for active optimal reduced state estimation of an object may comprise: one or more radar systems for obtaining sensor measurements relating to the object being tracked; one or more data storage devices for storing the sensor measurements; one or more computer processors in communication with the one or more data storage devices; and a memory storing program instructions for execution by the one or more computer processors. The program instructions may cause the one or more computer processors to: initialize a state estimate having at least one boundary parameter; input system matrices; determine parameter covariances corresponding to the at least one boundary parameter; increment a time index; extrapolate a state estimate, covariance, and bias coefficients; input a measurement noise covariance; compute filter gains; input received sensor measurements from the one or more sensors; and update the state estimate, the covariance, and the bias coefficients based on the received sensor measurements. The memory may further include program instructions which cause the one or more computer processors to determine whether a change in the flight regime of the object has occurred, and responsive to a positive determination that a change in the flight regime has occurred: determine updated boundary parameters applicable to the object based on the change in the flight regime; determine updated boundary parameter covariances based on the determined updated boundary parameters before updating the state estimate, the covariance, and the bias coefficients based on subsequently received sensor measurements; and output to a track manager computer the updated state estimate.

The memory storing program instructions which cause the one or more computer processors to determine updated boundary parameter covariances applicable to the object may comprise the memory storing program instructions which cause the one or more computer processors to reinitialize the state estimate and determine boundary parameter covariances for the reinitialized state estimate based on the updated boundary parameters. In an embodiment, the one or more boundary parameters may comprise an acceleration boundary parameter and the one or more updated boundary parameters comprises an updated acceleration boundary parameter. In an embodiment, the boundary parameter comprises one or both of a turn rate boundary parameter and a tangential acceleration boundary parameter.

The memory storing program instructions which cause the one or more computer processors to determine whether a regime change has occurred may comprise the memory storing program instructions which cause the one or more computer processors to determine whether a change in the flight regime of the object is likely to occur by: identifying a type of the object being tracked; identifying a current flight regime of the object; and determining whether the flight regime of the object is likely to occur based on analysis of the type of the object, the current flight regime of the object, the received measurements from the one or more sensors, and data indicative of flight characteristics corresponding to the type of object.

In an embodiment, the memory storing program instructions which cause the one or more computer processors to, responsive to the positive determination that a regime change has occurred, determine updated known bounded values and update the known bounded values of the system with the updated known bounded values comprises the memory storing program instructions which cause the one or more computer processors to: determine, based on a type of the object being tracked and a regime of the object being tracked, updated known bounded values; and determine boundary parameter covariances corresponding to the updated bounded values, wherein the updated bounded values are physical bounds on the boundary parameters that are not state variables of the system.

DETAILED DESCRIPTION

Figure 1:
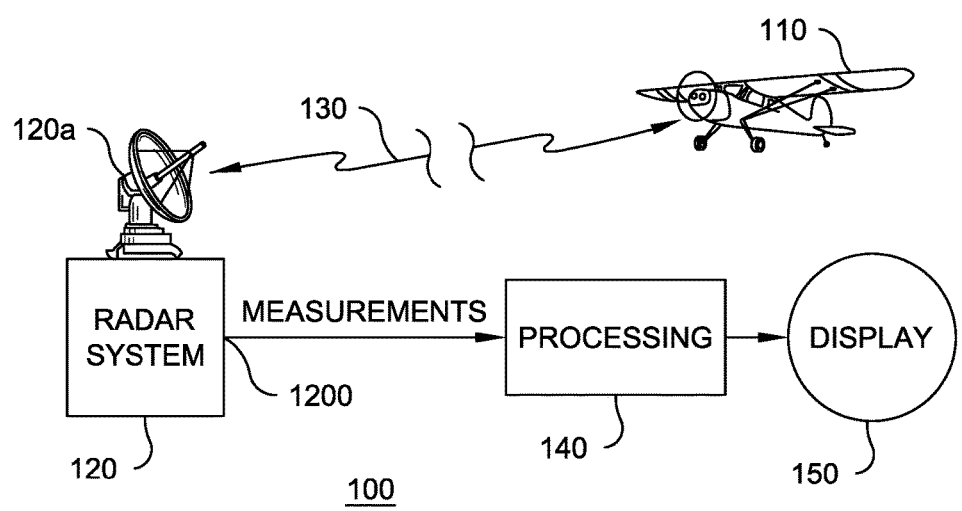
FIG. 1 depicts a simplified block diagram of an exemplary system for estimating the state of a target.

It is to be understood that the figures and descriptions of the present invention have been simplified to illustrate elements that are relevant for a clear understanding of the present invention, while eliminating, for purposes of clarity, many other elements found in state estimation systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, a simplified diagram of a target tracking system 100 is shown. System 100 may track a target, for example, an aircraft 110, transitioning back and forth between discrete models of flight (e.g. performing a direction change and continuing on a relatively linear flight path) using one or more sensors, such as a radar system 120. Radar system 120 may include radar antennas 120a, 130a which transmit and subsequently receive radar signal 130 reflected off target 110 and/or other background features. Returned signal 130 allows the generation of measurements at output port 120o of the radar system. These measurements include values of at least target position, which may be in the form of range and angles (e.g. elevation and azimuth) from the radar systems. In practice, these measurements may be corrupted by unknown random measurement noises. These noises may be characterized by a covariance and unknown time-varying biases having known bounds. The biases may be the result of, for example, sensor misalignment. While a single radar system 120 is shown, systems may include more than one radar system, and any suitable type and number of radar may be used.

The measurements from radar system 120 is applied to a processing arrangement 140 for determining various target parameters, for example, course (i.e. direction of motion), speed, and target type. The estimated position of the target, and possibly other information, is provided to a utilization apparatus, for example, a radar display 150, for interpretation by an operator. The operator (or possibly automated decision-making equipment) may make decisions as to actions to be taken in response to the displayed information.

Figure 2:
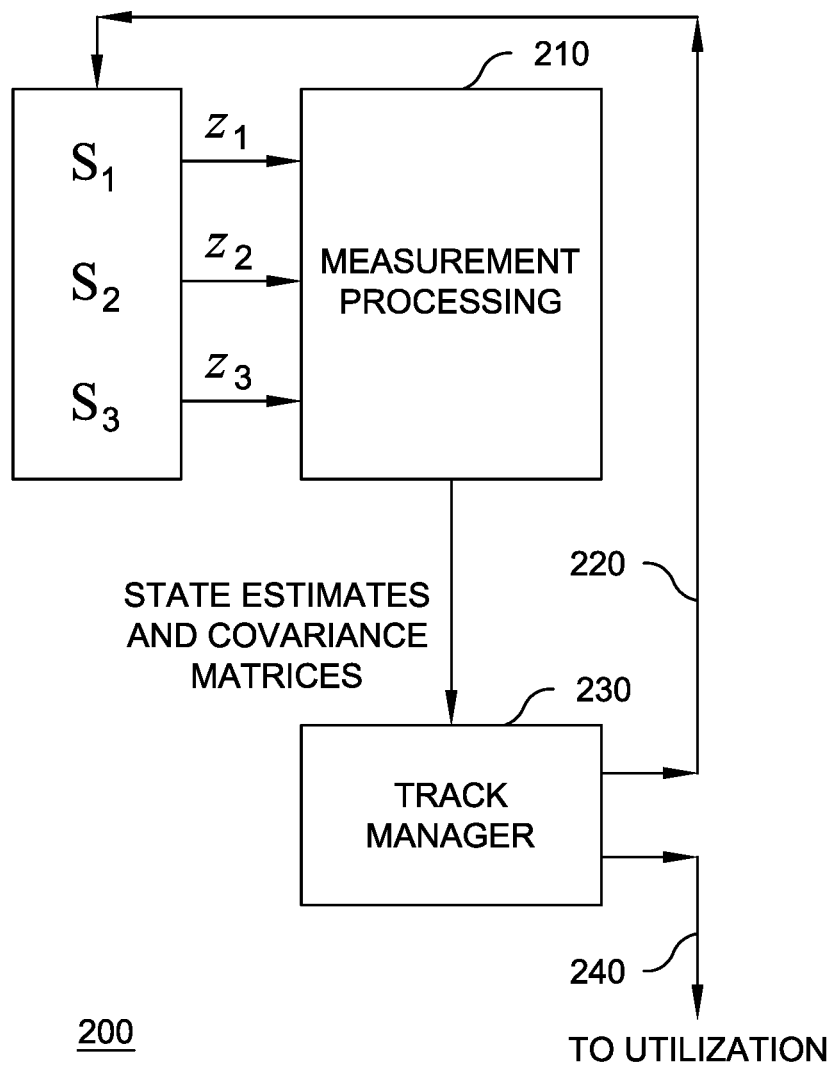
FIG. 2 depicts a notional processor which may perform calculations to estimate the state of the target together with its covariance.

FIG. 2 illustrates block 180 of FIG. 1, which represents a localized or distributed processor which receives signals $z_1$, $z_2$, and $z_3$ representing measurements from one or more radar systems, such as radar system 120 FIG. 1, and which processes the sensor measurements in attempting to estimate position and velocity states of the target 110 in FIG. 1. In FIG. 2, the resulting state estimates and covariance matrices are fed to a track manager, illustrated as a block 230, which may determine commands to accurately point or slew the radar (or other types of sensors) at or toward the target at the anticipated next opportunity for detecting the target. The commands may be fed by way of a path 220 back to the radar systems to adjust their pointing. The state estimates and covariances may also made available to one or more users by way of a path 240. The logic flow of the measurement processing to obtain state estimates and covariances is illustrated as 400 of FIG. 4.

Figure 3:
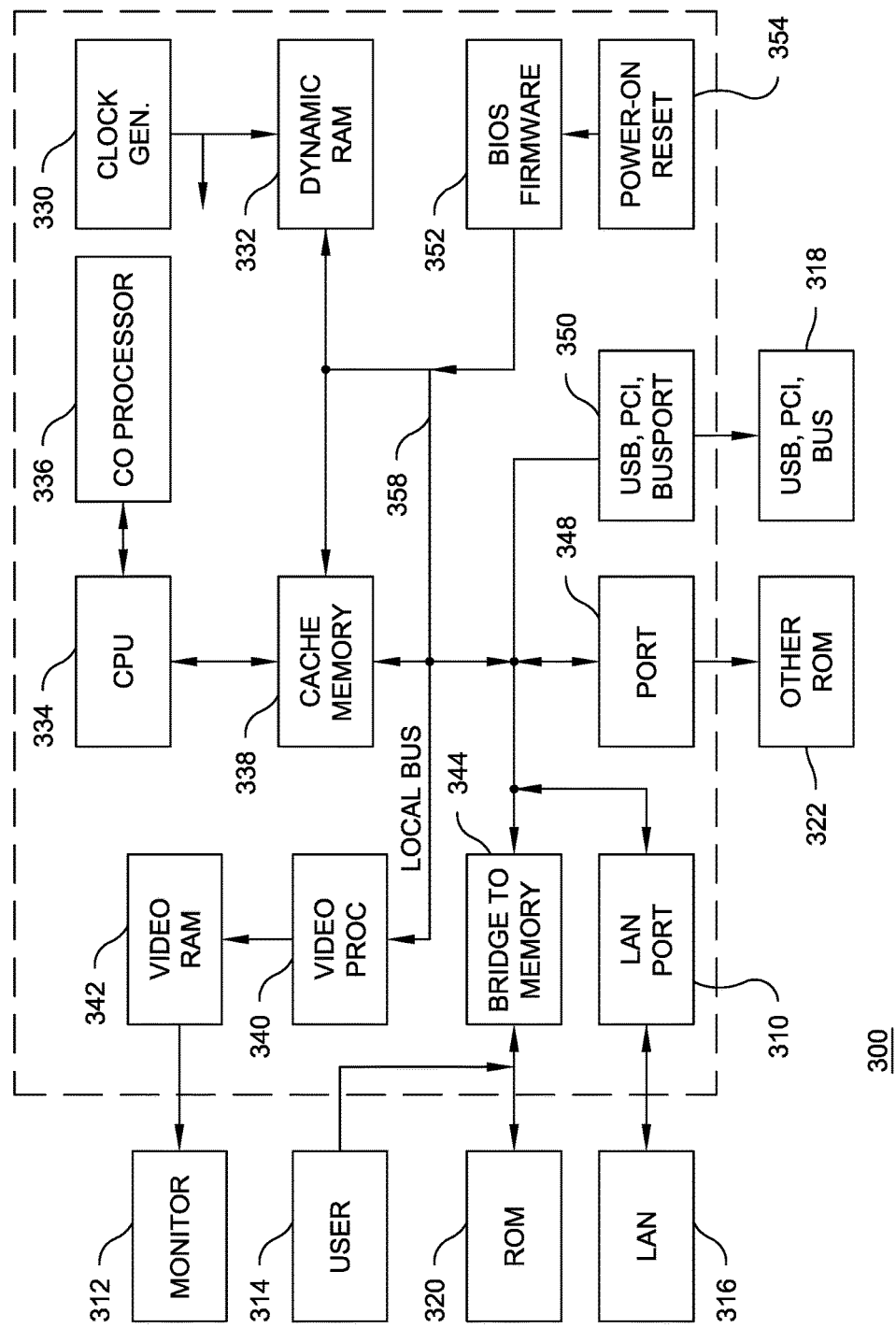
FIG. 3 depicts a representative computer or processor which may perform calculations and processing pursuant to the disclosure.

FIG. 3 is a simplified diagram in block and schematic form illustrating a representative computer which may be used as processor 210 of FIG. 2. In FIG. 3, computer 300 includes a processor or board 310 and outboard elements such as a monitor 312, user controls such as a keyboard and/or mouse, illustrated as a block 314, local area network (LAN) 316, additional buses 318 such as PCI and/or USB, and read-only memory (ROM) 320, which is ordinarily a hard drive, and additional ROM 322, which may be, for example, a flash memory stick or capacitance disk (CD). The main portion of the computer processor or board 310 includes a central processing unit (CPU) 334, which communicates with a cache dynamic memory 338. At initial turn-on of the computer 300, a power-on reset illustrated as a block 354 enables a preloaded basic input/output system (BIOS) flash memory, which loads cache 338 with information that initializes the booting sequence by the CPU. When booted, CPU 334 may communicate with a coprocessor illustrated as 336, and also communicates with main dynamic memory (DRAM) 332 and a local bus 358. Local bus 358 provides communication between the CPU and other elements of the computer, as for example the video processor 340 and video random-access memory 42 for driving a monitor. Local bus 58 also communicates by way of a bridge 344 to external ROM 320 and to user controls 318. Local bus 358 further communicates by way of a port 348 with other ROM 322 if desired, by way of a USB or PCI bridge or port 350 with external buses, and/or by way of a local area network (LAN) port 346 with a LAN 316. While one exemplary computer system is shown in FIG. 3, in an embodiment the system may include one or more computer systems or computer processors and associated hardware. Those skilled in the art will understand how to use one or more computers to perform the processing required by elements of the disclosure.

Figure 4:
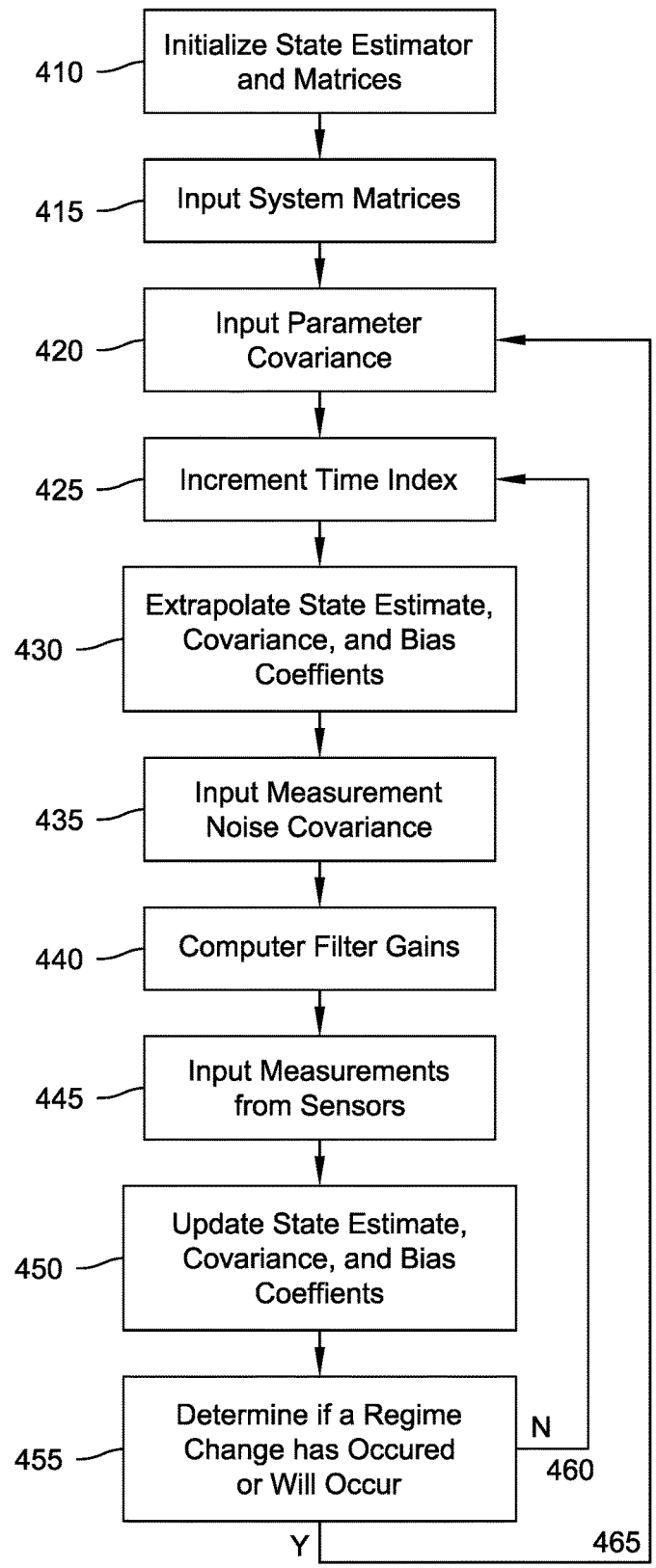
FIG. 4 depicts a flow diagram illustrating processing according to an aspect of the disclosure.

The simplified logic flow chart or diagram 400 of FIG. 4 illustrates a method according to an aspect of the invention. FIG. 4 generally illustrates an ORSE state estimator, which includes a process for updating boundary parameters that are used within the estimator. U.S. Pat. No. 7,180,443, issued Feb. 20, 2007 in the names of Mookerjee and Reifler, which is incorporated by reference in its entirety, generally describes an ORSE state estimator which operates using a single set of boundary parameters that are input during the initialization of the estimator. In general, U.S. Pat. No. 7,180,443 describes how to determine state estimation and state error covariance for generalized or arbitrary motion of a target or moving object where the sensors provide complete measurements, namely each measurement locating a point in three dimensional space at a known time with a non-singular measurement covariance matrix. The embodiments of the system and method allow for a single ORSE filter to be active over the exo-endo atmospheric regions, without full parametric representation or devolution, i.e. retaining the benefit of an ORSE filter.

In FIG. 4, the logic flow of the invention begins with initialization of the state estimator $\hat{x}(k_0|k_0)$ and the matrices $M(k_0|k_0), D(k_0|k_0)$. Matrix $M(j|k)$ is defined as the covariance of the state estimation errors at time $t_j$ due only to the errors in the measurements $z(i)$ for $1 \leq i \leq k$ and a priori initial information that is independent of the parameter uncertainty. Matrix $D(j|k)$ is defined as the matrix of bias coefficients, which linearly relates state estimation errors to the parameter errors, at time $t_j$ (after processing $k=0, 1, 2, \ldots$ measurements). The initial information is obtained in order to begin processing. From block 410, the logic of the invention of FIG. 4 flows to a block 415, which represents the accessing or inputting of the system transition matrix $\Phi$ and input matrix $\Gamma$, where F and G are:

$$F = \phi + \Gamma \frac{\partial u}{\partial x}\Big|_{x=\hat{x}(k|k), \lambda=\overline{\lambda}} \quad (1)$$

$$G = \Gamma \frac{\partial u}{\partial \lambda}\Big|_{x=\hat{x}(k|k), \lambda=\overline{\lambda}} \quad (2)$$

From block 415, the logic of the invention of FIG. 4 flows to a block 420, which accesses or inputs a parameter matrix $\Lambda$. The parameter matrix $\Lambda$ represents the physical bounds on the unknown parameters (which may also be known as known bounded values), such as turn rate boundary parameters and tangential acceleration boundary parameters, and is preferably selected based on a precise description of the physical system, and depends upon well-known physical phenomena and characteristics of real systems, such as the known flight characteristics of objects such as planes and missiles. Types of physical parameters, which might be considered for determination of $\Lambda$ in the case of maneuvers, are the turn rate $\omega$ and the tangential acceleration $\alpha$. This is a departure from the prior art, which uses a white process noise covariance W that does not correctly model the class of systems addressed by the invention herein.

From block 420 of FIG. 4, the logic flow of the invention proceeds to a block 425, which represents the incrementing of a time index k to k+1. The logic of the invention then flows to a further block 430, which includes extrapolating the state estimate, covariance, and bias coefficients. In an embodiment, block 430 represents the extrapolation of state estimates $z(k|k)$, and matrices $M(k|k)$, $D(k|k)$ according to $$\hat{x}(k+1|k) = \Phi \hat{x}(k|k) + \Gamma u(\hat{x}(k|k), \overline{\lambda}) \quad (3)$$

$$M(k+1|k) = FM(k|k)F' \quad (4)$$

$$D(k+1|k) = FD(k|k) + G \quad (5)$$

$$S(k+1|k) = M(k+1|k) + D(k+1|k)\Lambda D(k+1|k)' \quad (6)$$

From block 430 of FIG. 4, the logic of the invention flows to a block 435, which represents the accessing or inputting of the measurement noise covariance N. Block 440 represents the computation of the filter gain matrix K, and filter matrices Q, and L. The filter gain matrix K obtained in block 322 of the arrangement of FIG. 4 is obtained through use of M(k+1|k),D(k+1|k) and Λ to formula S(k+1|k) in equation (6). The covariance of the residual Q is calculated as:

$$Q=HS(k+1|k)H'+N \quad (7)$$

The filter gain matrix K is calculated as:

$$K=S(k+1|k)H'Q^{-1} \quad (8)$$

and the matrix L is calculated as L=I−KH (33) where I is the identity matrix. From block 440 of FIG. 4, the logic flows to a further block 445, which represents the measurement z(k+1) of aspects of the state of the system.

The logic may then flow from block 445 of FIG. 4 to a block 450, which represents the updating of the state estimate and the associated matrices. More particularly, the state estimate x̂(k+1|k+1) is calculated as $$\hat{x}(k+1|k+1)=\hat{x}(k+1|k)+K[z(k+1)-H\hat{x}(k+1|k)] \quad (9)$$

The matrices M(k+1|k+1) and D(k+1|k+1) are calculated as $$M(k+1|k+1)=LM(k+1|k)L'+KNK' \quad (10)$$

$$D(k+1|k+1)=LD(k+1|k) \quad (11)$$

respectively. Then, the matrix of the total covariance is calculated as $$S(k+1|k+1)=M(k+1|k+1)+D(k+1|k+1)\Gamma D(k+1|k+1)' \quad (12)$$

and equation (12) represents a mean-square criterion which may be used for a root-mean-square determination.

The logic may then flow from block 450 to block 455, in which a determination is made as to whether a regime change (e.g. a flight regime change) has occurred, such as if the state estimate indicates that a current flight regime is different than a previous flight regime, or if a flight regime change is anticipated to occur. When it is determined that a regime change has not occurred or is not anticipated to occur, the logic flows by path 460 to block 425 where the time interval is incremented and the process continues receiving measurement data from the sensors and estimating the state of the object.

However, if it is determined that a regime change has occurred, or will occur, the process flows by path 465 to block 420, where new boundary parameters are determined and input into the parameter covariance. By way of example, the sensors of a radar system may identify an object, and processing may determine based on the sensor data that the object is a missile, and that the missile is in thrust. These initial determinations may be used to initialize the state estimator with boundary parameters of the particular type of missile in thrust. For example, the ORSE filter may be initialized with turn rate parameter ω0 and/or tangential acceleration α0 in the parameter matrix Λ$_0$. After the initial identification or determination of the state or region of the object, additional processing of sensor data, in association with known characteristics of the type of object, may lead to a determination that the object will be transitioning to a ballistic state, from the initial thrusting state. For example, it may be known that a certain type of missile maintains a thrust state for a certain period of time, or that the missile maintains a thrust state until it reaches a particular altitude, speed, or other parameter. This knowledge of the known characteristics of a type of missile, when combined with sensor data, may enable a determination that the missile will be changing states. In another example, a change in state of an object is directly observable from the sensor data, such as identification of the presence or absence of a plume corresponding to an object.

Once a determination has been made that an object will be changing its state or has changed its state, the ORSE filter may be updated to include updated boundary parameters (which may also be known as updated known bounded values) which apply to the new or anticipated regime change. In the current example of the object changing from thrust to ballistic movement, the updated turn rate boundary parameter ω1 and/or tangential acceleration boundary parameter α1 in the parameter matrix Λ$_1$ may be much different than the initial parameters, as it is expected that the boundaries of those parameters will have a much smaller value when the object is in ballistic motion versus propelled motion. To account for the updated boundary parameter data, the ORSE filter is calculated to update the boundary parameters and the parameter covariance. An updated state estimate may then be determined based upon the updated boundary parameters and the parameter covariance.

Updating the boundary parameters and the corresponding boundary parameter covariance follows from a determination that the bias contains the maximum difference between truth and the state vector, which follows immediately from the following considerations:

a) the G matrix added to the ORSE bias prediction $D_{n|n-1}$ represents the effect of maximum acceleration on the position and velocity over a period;

b) the update $D_{n|n}$ is found by scaling the prediction with (I−K$_n$H); and c) the state update scales the measurement by K$_n$, Therefore if maximum acceleration occurs in truth over the period, the scaled acceleration effect in the state update added to the scaled acceleration effect in the bias update is the identity I times the G matrix. The conclusion to be drawn is that the bias portion of the ORSE covariance is the 100% containment bounds for the effects of uncompensated acceleration on position and velocity. Accordingly, if the maximum possible bias changes at an update, the bias matrix may be modified as shown below to reflect the new constraint.

A target is presumed to follow a simple Newtonian trajectory truth with an acceleration (or similar parametric effect) represented as a constant, which may be an average acceleration over an interval and with magnitude less than or equal to some $a_{max}$ (written simply as a in subsequent sections):

$$x(t)=x_0+v_0 t+at^2/2, \quad (13)$$

$$v(t)=v_0+at. \quad (14)$$

For convenience, let the initial state ($x_0$, $v_0$, a) at $t_0$ correspond to the 0$^{th}$ observation. If error-free observations are made at intervals T the position and velocity at the n$^{th}$ observation then the state ($x_n$, $v_n$, a) at t=nT will be $$x_n=x_0+v_0 nT+(a/2)(nT)^2, \quad (15)$$

$$v_n=v_0+anT. \quad (16)$$

If a target accelerates in two successive intervals with different accelerations in each interval, then at interval 2

$$x_1=x_0+v_0 t+a_0 t^2/2 \quad (17)$$

$$v_1=v_0+a_0 t, \quad (18)$$

$$x_2=x_1+v_0 t+(t^2/2)(a_1+2a_0) \quad (19)$$

$$v_2=v_1+a_1 t \quad (20)$$

Prediction of the position of an object being tracked, without accounting for maximum bias, may be calculated as follows. Measurement errors are assumed to be $\epsilon_n \in N(0, \sigma_m)$. Initialization is independent of the filter model but instead is based only upon the initial measurements plus samples of the measurement error distribution, $z_1 = x_1 + \epsilon_1$ and $z_0 = x_0 + \epsilon_0$. The effective updated position is just $x_{s1} = z_1$ and the effective updated speed is $v_{s1} = (z_1 - z_0)/T$. If acceleration is present, then $v_1$ will have an error of $b_{v1} = (\frac{1}{2})aT$ which follows directly from the kinematic expressions. The position is a measurement with white noise error only hence $b_{x1} = 0$ and, based on the previously noted considerations:

$$D_{1|1}a = \begin{pmatrix} 0 \\ \frac{T}{2} \end{pmatrix} a. \quad (21)$$

The filter is initialized with the above values and predicts the position and speed at the next update as:

$$x_{2|1} = x_{s1} + v_{s1}T, \quad (22)$$

$$v_{p2|1} = v_{s1}. \quad (23)$$

If the target is not accelerating, then the equations give the correct position and speed:

$$x_{2|1} = x_{s1} + v_0 T + \epsilon_{v1} T, \quad (24)$$

$$v_{p2|1} = v_0 + \epsilon_{v1}. \quad (25)$$

If acceleration occurs in the first interval, then:

$$v_{s1} = v_0 + \epsilon_{v1} + (\frac{1}{2})a_0 T \quad (26)$$

and the predictions are:

$$x_{2|1} = x_1 + v_0 T + (\frac{1}{2})a_0 T^2 + \epsilon_1 + \epsilon_{v1}T, \quad (27)$$

$$v_{p2|1} = v_{s1}. \quad (28)$$

The unbiased speed in this case is:

$$v_1 = v_0 + \epsilon_{v1} + a_0 T \quad (29)$$

so that the unbiased predictions are:

$$x_{2|1} = x_1 + v_0 T + a_0 T^2 + \epsilon_1 + \epsilon_{v1}T, \quad (30)$$

$$v_{p2|1} = v_1. \quad (31)$$

The unbiased predictions, however, do not capture acceleration in the predicted state. Furthermore, while low indices are used in the examples which refer to early updates, the method is applicable to any updates, including later updates.

A state update of the ORSE estimator may be used to account for bias and acceleration in the predicted state. The ORSE update equations for position and speed are:

$$x_{2|2} = x_{2|1} + \alpha(z_2 - x_{2|1}), \quad (32)$$

$$v_{2|2} = v_{2|1} + \left(\frac{\beta}{T}\right)(z_2 - x_{2|1}). \quad (33)$$

If accelerations have occurred in both intervals but with different accelerations in each interval, then the update equations may be written, based on the Newtonian truth kinematics and the unbiased predictions as equations:

$$x_{2|2} = x_1 + v_0 T + \frac{1}{2}a_0 T^2 + \alpha\left(\frac{1}{2}(a_0 + a_1)T^2\right) + \text{(noise)}, \quad (34)$$

$$v_{2|2} = v_0 + \frac{1}{2}a_1 T + \left(\frac{\beta}{2T}\right)((a_0 + a_1)T^2) + \text{(noise)}. \quad (35)$$

The resultant maximum filter bias for difference accelerations in successive intervals may then be found by subtracting the pertinent update from the truth, disregarding noise. Here this difference is:

$$xbias_2 = x_1 + (v_0 + a_0 T)T + \frac{1}{2}a_1 T^2 - x_1 - v_0 T - \quad (36)$$

$$\frac{1}{2}a_0 T^2 - \alpha\left(\frac{1}{2}(a_0 + a_1)T^2\right)$$

$$= \frac{1}{2}T^2(1 - \alpha)(a_0 + a_1)$$

$$ybias_2 = v_0 + \frac{1}{2}a_1 T + \left(\frac{\beta}{2T}\right)((a_0 + a_1)T^2) - v_0 - (a_0 + a_1)T \quad (37)$$

$$= \frac{1}{2}T[-a_1(1 - \beta) - a_0(2 - \beta)]$$

The bias matrix may then be updated In accordance with the truth, prediction, status update, and maximum bias equations. As noted earlier, (a) the G matrix added to the ORSE bias prediction $D_{n|n-1}$ represents the effect of maximum acceleration on the position and velocity over a period; b) the update $D_{n|n}$ is found by scaling the prediction with $(I - K_n H)$; and c) the state update scales the measurement by $K_n$, therefore if maximum acceleration occurs in truth over the period, the scaled acceleration effect in the state update added to the scaled acceleration effect in the bias update is the identity I times the G matrix.

Based on the foregoing, and with distinct biases in successive updates, an approach may be taken in which the bias matrix $\Lambda$ is initialized (here a scalar) with $a_0$, and subsequently replaced by $a_1$ in anticipation of the new maximum acceleration:

$$D_{n+1|n} = FD_{n|n} + G \quad (38)$$

$$D_{n+1|n+1} = (I - K_n H)D_{n+1|n} \quad (39)$$

with $$D_{1|1}\Lambda = \begin{pmatrix} 0 \\ \frac{1}{2}T \end{pmatrix} a_0. \quad (40)$$

Then the prediction for step 2 from step 1 incorporates the new acceleration as shown $$D_{2|1}\Lambda = \begin{pmatrix} 1 & T \\ 0 & 1 \end{pmatrix}\begin{pmatrix} 0 \\ \frac{1}{2}T \end{pmatrix} a_0 + \begin{pmatrix} \frac{1}{2}T^2 \\ T \end{pmatrix} a_1 = \begin{pmatrix} \frac{1}{2}T^2(a_0 + a_1) \\ \frac{1}{2}T(a_0 + 2a_1) \end{pmatrix}. \quad (41)$$

where here the bias predictor and acceleration matrices are 2×1 column vectors of matrices, in which D is a bias prediction matrix, $\Lambda$ is a bias matrix, T is the track update interval. Given an arbitrary matrix, $$D_{2|2}\Lambda = \begin{pmatrix} 1-\alpha & 0 \\ -\frac{\beta}{T} & 1 \end{pmatrix} \begin{pmatrix} \frac{1}{2}T^2(a_0+a_1) \\ \frac{1}{2}T(a_0+2a_1) \end{pmatrix} = \frac{T}{2}\begin{pmatrix} (1-\alpha)(a_0+a_1)T \\ a_0(1-\beta)+a_1(2-\beta) \end{pmatrix} \quad (42)$$

in agreement with the maximum biases xbias and ybias above, in which $D_{jj}$ is a smoothed bias matrix; $\Lambda$ is a bias matrix; T is a position and velocity at an $n^{th}$ observation; and $\alpha$ and $\beta$ are the gains of the estimator corresponding to position and speed. Djj is the smoothed estimate at step j, in this case step 2. This matrix is the maximum expected bias given the condition of successive arbitrary constrained accelerations. This may be shown to be true at each subsequent update by continuing as above. Consequently, updating ORSE uncompensated acceleration for new constraints is a simple matter of substituting the new value into the prediction prior to the update, as noted above, which effects an updating of a known bounded value with an updated known bounded value.

In an alternative embodiment for actively updating the boundary parameters for an ORSE estimator, a simplified one-dimensional case is shown to illustrate the technique. For the general case, let $D_{s,0}$ be the last smoothed update where the initial acceleration boundary matrix was applicable. Then the predicted ORSE D-matrix is $$D_{p1}\Lambda = FD_{s,0}\Lambda_0 + G\Lambda_1 \quad (43)$$

where in one-dimension with update interval T:

$$F = \begin{pmatrix} 1 & T \\ 0 & 1 \end{pmatrix} \quad (44)$$

$$G = \begin{pmatrix} \frac{1}{2}T^2 \\ T \end{pmatrix} \quad (45)$$

The matrix $\Lambda_0$ is the acceleration boundary matrix applicable to update n=0 and preceding intervals, represented as a scalar $a_0$ for one-dimension, and $\Lambda_1 = a_1$ is the acceleration boundary matrix applicable after state n=0. The processing may be easily extended to multiple dimensions by known art. The smoothed D-matrix estimate for any update in the $\Lambda_1$ region may be written as follows:

$$D_{sn}\Lambda = D_{0sn}\Lambda_0 + D_{1sn}\Lambda_1 \quad (46)$$

where $$D_{0sn} = (I-K_n)D_{0p,n-1} = (I-K_n)FD_{0s,n-1} \quad (47)$$

using $$D_{0p,n-1} = FD_{0s,n-1}. \quad (48)$$

and where $K_n$ is the ORSE gain matrix which for one-dimension is given in terms of the position gain $\alpha$ and the velocity gain $\beta$ by:

$$K_n = \begin{pmatrix} \alpha \\ 0 & \frac{\beta}{T} \end{pmatrix} \quad (49)$$

As previously discussed, the D-matrix $D_{0s,0}$ is the last smoothed matrix from the ORSE prior to the start of the $\Lambda_1$ region. Also $$D_{1sn} = (I-K)D_{1p,n-1} = (I-K_n)(FD_{1s,n-1}+G) \quad (50)$$

The matrix $D_{pn}$ is the predicted ORSE covariance for step n in the $\Lambda_1$ region, with $D_{1,s,0}=0$ is a zero matrix. The foregoing alternative one-dimensional embodiment may be extended to multiple orthogonal spatial dimensions following general matrix formulation.

In an another alternative embodiment for actively updating the boundary parameters for an ORSE estimator, new boundary parameters corresponding to a new regime may be input in relation to an updated parameter covariance. In an embodiment, the transition from regime 1 with maximum acceleration $a_1$ to regime 2 with maximum acceleration $a_2$ may be carried out by using a parameter matrix $\Lambda_2$ in the prediction matrix. The prediction matrix $D_{pn}$ consists of a component $FD_{sn-1}$ that propagates the current smoothed filter estimate through the update interval, and the G matrix which converts the acceleration occurring in the update interval (thus not present in the current state propagation) into the resultant change in parameters of the filter state vector:

$$D_{pn} = FD_{sn-1} + G \quad (51)$$

Consequently, representing the initial maximum bias matrix $\Lambda_1$ with components $\delta_{ij}a_1$ and the matrix applicable to the new regime as $\Lambda_2$ with components $\delta_{ij}a_2$ the prediction is:

$$D_{pn}\Lambda = FD_{sn-1}\Lambda_1 + G\Lambda_2 \quad (52)$$

The D-matrix update applies the gains matrix and is:

$$D_{sn} = (I-K_nH)D_{pn} \quad (53)$$

The smoothed state $D_{sn}\Lambda$ may be split into two additive terms $D_{sn}\Lambda_1 + D_{sn}\Lambda_2$ and propagated as usually or with divergent gain matrices. The $\Lambda_2$ component alone contains G.

In another embodiment, the determination that a regime change has or will imminently occur may instead proceed to block 410 so that the state estimator is reinitialized with bounds that correspond to the new or imminent regime (i.e., a reinitialized state estimate is generated). In embodiments, reinitializing the state estimate or estimator may take longer than entering a new bound as an input parameter covariance in step 420.

Figure 5:
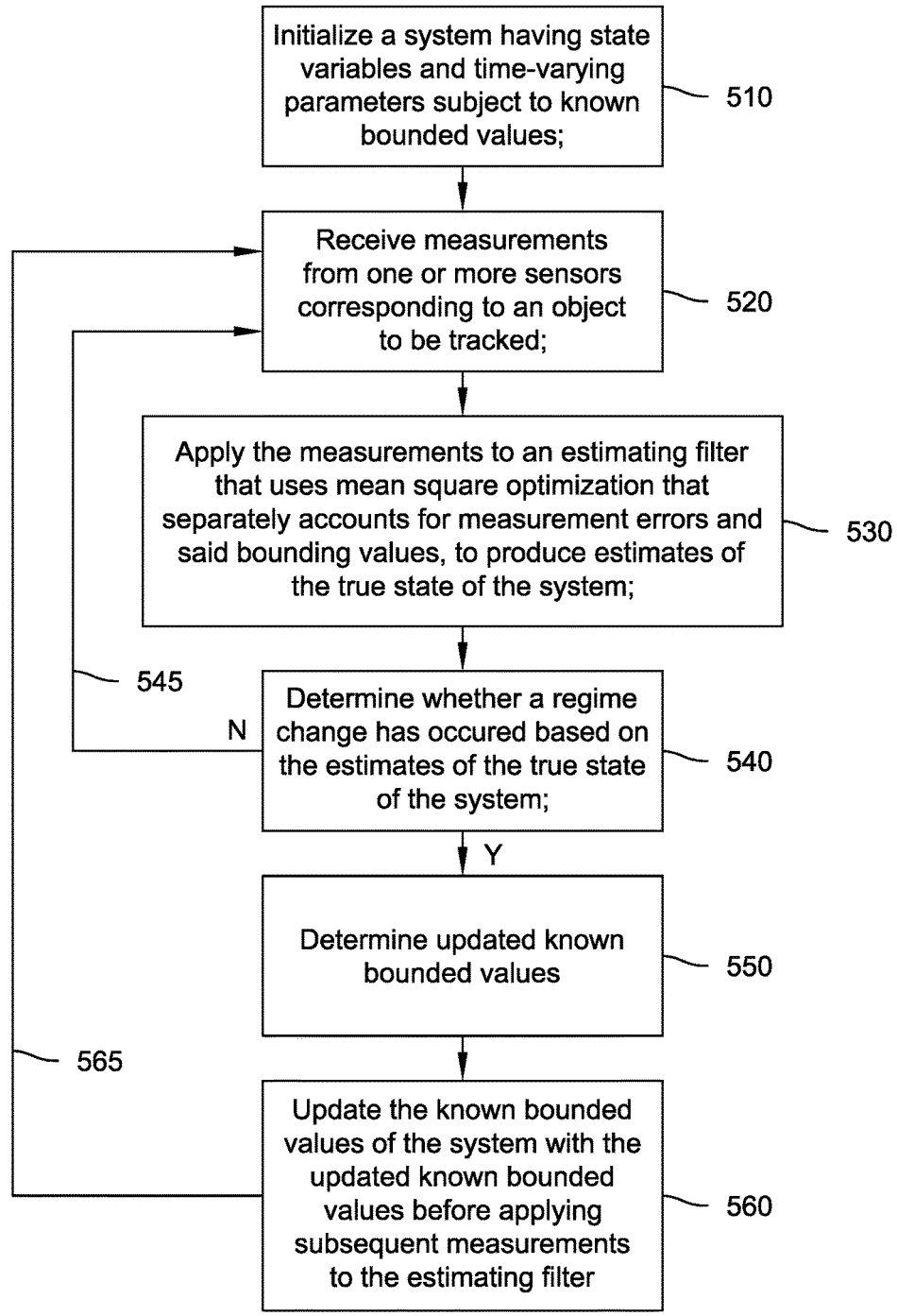
FIG. 5 depicts a flow diagram illustrating processing according to an aspect of the disclosure.

FIG. 5 depicts an alternative method or process 500 for actively estimating the state of a system using an ORSE estimator that has updatable boundary parameters (also known as updated known bounded values to the original known bounded values). At block 510, a system is initialized that has state variables and also unknown, multidimensional, arbitrarily time-varying parameters, which are subject to known bounded values. In embodiments, initialization of the system may include one or more of the steps described in relation to blocks 410-440 of FIG. 4, such as initializing the state estimate/estimator and matrices, inputting the system matrices, inputting the input parameters and determining the parameter covariances, incrementing a time index, extrapolating a state estimate, covariance, and bias coefficients, inputting measurement noise covariances, and computing filter gains. At block 520, measurements may be received from one or more sensors corresponding to an object to be tracked. As will be understood, the measurement information may be obtained from the same or different types of sensors, and may also be obtained from sensors at the same or different locations. At block 530, the measurements may then be applied to an estimating filter that explicitly uses a mean square optimization criterion that separately accounts for measurement errors and said bounding values, to produce estimates of the true state of the system. Producing the estimates may one or more of updating the state estimate, covariance, and bias coefficients, as disclosed in relation to block 450 of FIG. 4.

At block 540, a determination is made as to whether a regime change has occurred, based on the estimates of the true state of the system. This may be performed as described in relation to block 455 of FIG. 4, or by a specialized process for determining regime change. As noted, boundary parameters such as a turn rate boundary parameter $\omega$ and a tangential acceleration boundary parameter $\alpha$ may differ according to the regime in which an airborne object is in. Thus, adjusting the state estimator so that it accounts for regime changes increases the consistency and accuracy of the estimator. If a determination is made that a regime change has not occurred, the estimator flows to block 520 by path 545 where additional measurements are received and processed to determine the state and whether a regime change has occurred.

If the determination is made that a regime change has occurred, at block 550 updated known bounded values are determined that apply to the object in the new regime. By way of example, and as described in relation to block 455 of FIG. 4, if the state estimator determines that the object being tracked has or will be changing to a regime of ballistic travel from a regime of propelled travel, updated bounds for turn rate and tangential acceleration may be determined. For example, in an embodiment, the updated boundary parameters (i.e., the updated bounds) may be looked up in a database that contains bounds data for different types of objects in different regimes of operation at different altitudes or other measurable characteristics. After the updated boundary parameters are determined, the bounds of the estimator parameter covariance may be updated with the updated bounds and the parameter covariances determined, before the application of subsequent measurements to the estimating filter. The process may then flow to block 520 by path 565 where additional measurements are received and then applied to the filter to estimate the state of the object being tracked, which may provide an updated state estimate of the object. In an embodiment (not shown in FIG. 5), estimates of the true state of the system may be output or transmitted to a tracker computer or track manager computer system that also has use for the state information. For example, the tracker system may be part of a separate defense system or an offensive system which is also keeping track of the object.

Figure 6:
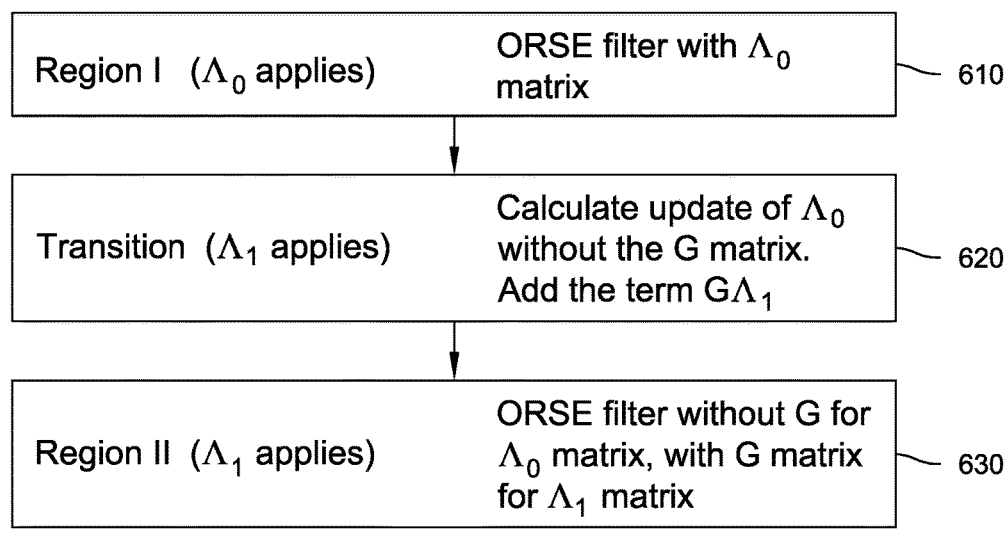
FIG. 6 depicts a flow diagram illustrating processing according to an aspect of the disclosure.

FIG. 6 depicts a simplified flowchart 600 of the embodiments of the invention to update one or more boundary parameters for an ORSE filter. Flowchart 600 begins at block 610, in which the current regime of the object being tracked is identified as "Region I." In Region I, the ORSE filter operates with initial parameter matrix $\Lambda_0$. While the object is operating in Region I, sensor data may be received from which a determination may be made that the object will be changing regimes. When this determination has been made, the process continues to block 620, in which the current regime for the object being tracked is identified as "Transition." In the transition, an update of initial parameter matrix $\Lambda_0$ is calculated, without the G matrix. The term $G\Lambda_1$ is added to the calculations to prepare for the transition to the next regime. At block 630, the object is operating in Region II, in a new regime compared to the regime of Region I. In region II, the ORSE filter includes the $\Lambda_0$ matrix without the G matrix, and includes the $\Lambda_1$ matrix with the G matrix. This configuration of the ORSE filter in Region II thereby implements the updated boundary parameters $\Lambda_1$ in the matrix.

By way of example, the sensors of a radar system may identify an object, and processing may determine that the object is a missile, and that the missile is in thrust. These initial determinations may be used to characterize the object in thrust as being in Region 1, and the ORSE state estimator may be initialized with $\Lambda_0$ including boundary parameters of the particular type of missile in thrust. For example, the ORSE filter may be initialized with turn rate parameter $\omega 0$ and/or tangential acceleration $\alpha 0$ in the parameter matrix $\Lambda_0$. After the initial identification or determination of the state or region of the object, additional processing of sensor data, in association with known characteristics of the type of object, may lead to a determination that the object will be transitioning to a ballistic state, from the initial thrusting state. For example, it may be known that a certain type of missile maintains a thrust state for a certain period of time, or that the missile maintains a thrust state until it reaches a particular altitude. This knowledge of the known characteristics of a type of missile, when combined with sensor data, may enable a determination that the missile will be changing states. In another example, a change in state of an object is directly observable from the sensor data, such as identification of the presence or absence of a plume corresponding to an object. Once a determination has been made that an object will be changing its state or has changed its state, the ORSE filter may be updated to include updated boundary parameters which apply to the new or anticipated regime change. In the current example of the object changing from thrust to ballistic movement, the updated turn rate parameter $\omega 1$ and/or tangential acceleration parameter $\alpha 1$ in the parameter matrix $\Lambda_1$ will be much different than the initial parameters, as it is expected that the boundaries of those parameters will have a much smaller value when the object is in ballistic motion. To account for the updated boundary parameter data, the ORSE filter is calculated to update $\Lambda_0$ without the G matrix, and to add the term $G\Lambda_1$ to the filter calculations. Once the object is in Region II, the ORSE filter is operated without G for the $\Lambda_0$ matrix and with the G matrix for the $\Lambda_1$ matrix.

In an embodiment, the processes of FIGS. 4-6 may be performed by a system such as depicted in FIGS. 1-3. In an embodiment, the system may comprise one or more radar systems for obtaining sensor measurements relating to an object being tracked, one or more data storage devices for storing the sensor measurements, one or more computer processors in communication with the one or more data storage devices, and a memory for storing program instructions which are configured to cause the one or more computer processors to effect the state estimation system in accordance with the processes of FIGS. 4-6.

The Processing system 210 (FIG. 1), including the above-described ORSE filters, is described and illustrated herein only as exemplary systems for performing the described ORSE reduced state estimation update processes, and other embodiments may be contemplated by one of skill in the pertinent art without departing from the intended scope of this disclosure. More generally, the process or processes explained herein may be performed by one or more processors, which processors access a memory device, the memory device containing instructions, which instructions, when executed by the processors, cause the steps of a method for state estimation to be performed by the processors. It is understood that the processes may also be performed by special-purpose hardware, such as a radar system processor. Thus, the entire process, or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for actively estimating a true state of a system comprising:
   one or more radar systems for obtaining sensor measurements relating to an object being tracked;
   one or more data storage devices for storing the sensor measurements;
   one or more computer processors in communication with the one or more data storage devices;
   a memory storing program instructions which, when executed by the one or more computer processors, cause the one or more computer processors to:
      initialize a system having state variables and also having unknown, multidimensional, arbitrarily time-varying parameters, but which are subject to known bounded values;
      receive measurements from one or more radar systems corresponding to the object to be tracked;
      apply the measurements to an estimating filter that explicitly uses a mean square optimization criterion that separately accounts for measurement errors and bounded values, to produce estimates of the true state of the system;
      determine whether a regime change has occurred based on the estimates of the true state of the system;
      responsive to a positive determination that the regime change has occurred:
         determine updated known bounded values; and
         update the known bounded values of the system with the updated known bounded values before applying subsequent measurements to the estimating filter.

2. The system of claim 1, wherein the memory stores further program instructions which cause the one or more computer processors to output, to a tracker computer, the estimates of the true state of the system.

3. The system of claim 1, wherein the memory storing program instructions which cause the one or more computer processors to initialize a system having the state variables and also having the unknown, multidimensional, arbitrarily time-varying parameters, but which are subject to the known bounded values comprises the memory storing program instructions which cause the one or more computer processors to:
   initialize a state estimate and system matrices for the system;
   determine the known bounded values applicable to the object; and
   determine boundary parameter covariances corresponding to the known bounded values, wherein the known bounded values are physical bounds on boundary parameters that are not the state variables of the system.

4. The system of claim 3, wherein the memory storing program instructions which cause the one or more computer processors to apply the measurements to the estimating filter that explicitly uses a mean square optimization criterion that separately accounts for measurement errors and bounded values comprises the memory storing program instructions which cause the one or more computer processors to:
   extrapolate the state estimate, a covariance, and bias coefficients;
   input a measurement noise covariance; and
   compute filter gains;
   input the received measurements from the one or more sensors; and
   update the state estimate, the covariance, and the bias coefficients based on the received measurements.

5. The system of claim 1, wherein the memory storing program instructions which cause the one or more computer processors to determine whether the regime change has occurred based on the estimates of the true state of the system comprises the memory storing program instructions which cause the one or more computer processors to compare a previous flight regime of the object to a current flight regime of the object.

6. The system of claim 1, wherein the memory storing program instructions which cause the one or more computer processors to determine whether the regime change has occurred based on the estimates of the true state of the system comprises the memory storing program instructions which cause the one or more computer processors to determine whether a change in a flight regime of the object is likely to occur.

7. The system of claim 6, wherein the memory storing program instructions which cause the one or more computer processors to determine whether a change in the flight regime of the object is likely to occur comprises the memory storing program instructions which cause the one or more computer processors to:
  identify a type of the object being tracked
  identify a current flight regime of the object; and
  determine whether the change in the flight regime of the object is likely to occur based on analysis of the type of the object, the current flight regime of the object, the received measurements from the one or more sensors, and data indicative of flight characteristics corresponding to the type of object.

8. The system of claim 1, wherein the memory storing program instructions which cause the one or more computer processors to, responsive to a determination that the regime change has occurred, determine updated known bounded values and update the known bounded values of the system with the updated known bounded values comprises the memory storing program instructions which cause the one or more computer processors to:
  determine, based on a type of the object being tracked and a regime of the object being tracked, updated known bounded values; and
  determine boundary parameter covariances corresponding to the updated known bounded values, wherein the updated known bounded values are physical bounds on boundary parameters that are not the state variables of the system.

9. A method for actively estimating a true state of a system comprising the steps of:
  initializing, by one or more computer processors, a system having state variables and also having unknown, multidimensional, arbitrarily time-varying parameters, but which are subject to known bounded values;
  receiving, by the one or more computer processors, measurements from one or more radar system sensors corresponding to an object to be tracked;
  applying, by the one or more computer processors, the measurements to an estimating filter that explicitly uses a mean square optimization criterion that separately accounts for measurement errors and bounded values, to produce estimates of the true state of the system;
  determining, by the one or more computer processors, whether a regime change has occurred based on the estimates of the true state of the system;
  responsive to a positive determination that the regime change has occurred, updating, by one or more computer processors, the known bounded values of the system before applying subsequent measurements to the estimating filter.

10. The method of claim 9, further comprising outputting, by the one or more computer processors to a tracker computer, the estimates of the true state of the system.

11. The method of claim 9, wherein initializing the system having the state variables and also having the unknown, multidimensional, arbitrarily time-varying parameters, but which are subject to the known bounded values comprises:
  initializing, by the one or more computer processors, a state estimate and system matrices for the system;
  determining, by the one or more computer processors, the known bounded values applicable to the object; and
  determining, by the one or more computer processors, boundary parameter covariances corresponding to the known bounded values, wherein the known bounded values are physical bounds on boundary parameters that are not the state variables of the system.

12. The method of claim 11, wherein applying the measurements to the estimating filter that explicitly uses a mean square optimization criterion that separately accounts for measurement errors and bounded values comprises:
  extrapolating, by the one or more computer processors, the state estimate, a covariance, and bias coefficients;
  inputting, by the one or more computer processors, a measurement noise covariance; and
  computing, by the one or more computer processors, filter gains;
  inputting, by the one or more computer processors, the received measurements from the one or more radar system sensors; and
  updating, by the one or more computer processors, the state estimate, the covariance, and the bias coefficients based on the received measurements.

13. The method of claim 9, wherein determining whether the regime change has occurred based on the estimates of the true state of the system comprises comparing a previous flight regime of the object to a current flight regime of the object.

14. The method of claim 9, further comprising:
  identifying, by the one or more computer processors, a type of the object being tracked;
  identifying, by the one or more computer processors, a current flight regime of the object; and
  determining, by the one or more computer processors, whether a flight regime of the object is likely to occur based on analysis of the type of the object, the current flight regime of the object, the received measurements from the one or more radar system sensors, and data indicative of flight characteristics corresponding to the type of object;
  wherein determining whether the regime change has occurred based on the estimates of the true state of the system comprises determine whether a change in the flight regime of the object is likely to occur.

15. The method of claim 9, wherein determining updated known bounded values and updating the known bounded values of the system with the updated known bounded values comprises:
  determining, by the one or more computer processors based on a type of the object being tracked and a regime of the object being tracked, updated known bounded values; and
  determining, by the one or more computer processors, boundary parameter covariances corresponding to the updated known bounded values, wherein the updated known bounded values are physical bounds on boundary parameters that are not the state variables of the system.

16. A system for active optimal reduced state estimation of an object comprising:
  one or more radar systems for receiving sensor measurements relating to the object being tracked;
  one or more data storage devices for storing the sensor measurements;
  one or more computer processors in communication with the one or more data storage devices;
  a memory storing program instructions which, when executed by the one or more computer processors, cause the one or more computer processors to:

initialize a state estimate having at least one boundary parameter;
input system matrices;
determine parameter covariances corresponding to the at least one boundary parameter;
increment a time index;
extrapolate the state estimate, a covariance, and bias coefficients;
input a measurement noise covariance;
compute filter gains;
input received sensor measurements from the one or more radar systems;
update the state estimate, the covariance, and the bias coefficients based on the received sensor measurements;
determine whether a change in a flight regime of the object has occurred;
responsive to a positive determination that a change in the flight regime has occurred:
    determine updated boundary parameters applicable to the object based on the change in the flight regime; and
    determine updated boundary parameter covariances based on the determined updated boundary parameters before updating the state estimate, the covariance, and the bias coefficients based on subsequently received sensor measurements; and
output to a track manager computer the updated state estimate.

17. The system of claim 16, wherein the memory storing program instructions which cause the one or more computer processors to determine the updated boundary parameter covariances applicable to the object comprises the memory storing program instructions which cause the one or more computer processors to reinitialize the state estimate and determine the boundary parameter covariances for the reinitialized state estimate based on the updated boundary parameters.

18. The system of claim 16, wherein the at least one boundary parameter comprises one or both of a turn rate boundary parameter and a tangential acceleration boundary parameter.

19. The system of claim 16, wherein the memory storing program instructions which cause the one or more computer processors to determine whether the regime change has occurred comprises the memory storing program instructions which cause the one or more computer processors to determine whether a change in the flight regime of the object is likely to occur by:
    identifying a type of the object being tracked;
    identifying a current flight regime of the object; and
    determining whether the flight regime of the object is likely to occur based on analysis of the type of the object, the current flight regime of the object, the received measurements from the one or more radar systems, and data indicative of flight characteristics corresponding to the type of object.

20. The system of claim 16, wherein the memory storing program instructions which cause the one or more computer processors to, responsive to the positive determination that the regime change has occurred, determine updated known bounded values and update the known bounded values of the system with the updated known bounded values comprises the memory storing program instructions which cause the one or more computer processors to:
    determine, based on a type of the object being tracked and a regime of the object being tracked, updated known bounded values; and
    determine boundary parameter covariances corresponding to the updated known bounded values, wherein the updated known bounded values are physical bounds on boundary parameters that are not state variables of the system.

* * * * *